Figures 1, 2:
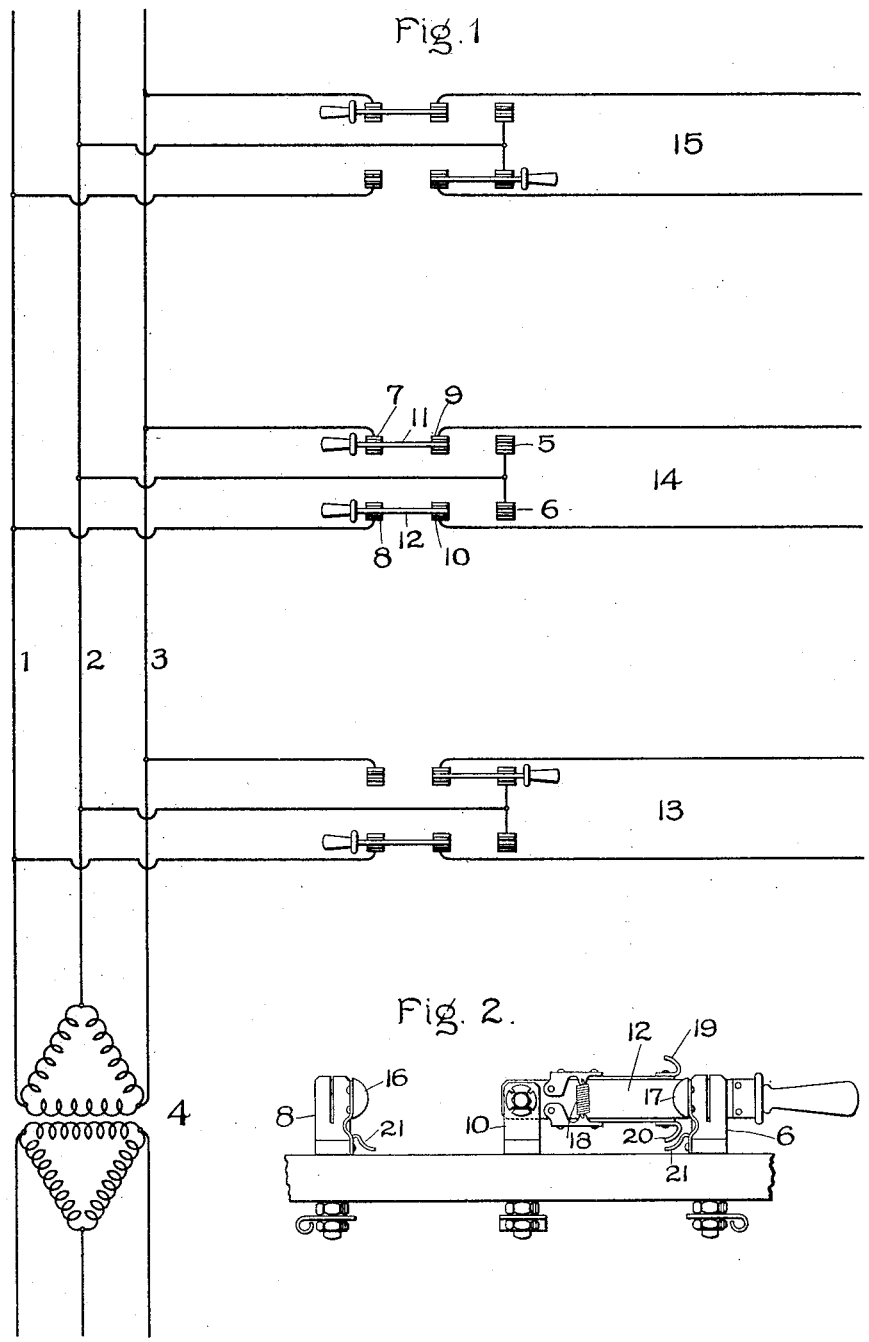

No. 660,815. Patented Oct. 30, 1900.
E. M. HEWLETT.
ELECTRIC DISTRIBUTION SYSTEM.
(Application filed July 28, 1900.)
(No Model.)

Witnesses:
Lewis P. Abell.
Benjamin B. Hull.

Inventor,
Edward M. Hewlett,
by Albert G. Davis
Atty.

UNITED STATES PATENT OFFICE.

EDWARD M. HEWLETT, OF SCHENECTADY, NEW YORK, ASSIGNOR TO THE GENERAL ELECTRIC COMPANY, OF NEW YORK.

ELECTRIC DISTRIBUTION SYSTEM.

SPECIFICATION forming part of Letters Patent No. 660,815, dated October 30, 1900.

Application filed July 28, 1900. Serial No. 25,086. (No model.)

*To all whom it may concern:*

Be it known that I, EDWARD M. HEWLETT, a citizen of the United States, residing at Schenectady, county of Schenectady, State of New York, have invented certain new and useful Improvements in Electric Distribution Systems, (Case No. 1,652,) of which the following is a specification.

This invention relates to systems of electrical distribution, the object of the invention being to permit the interconnection of a polyphase alternating-current circuit with a single-phase circuit, so as to transfer the latter to any desired pair of mains of the alternating-current circuit. In operating such systems it is frequently desired to transfer the load from one pair of alternating mains to another. By my invention this may be easily accomplished by means of two single-pole double-throw switches, the connections of the alternating-current mains and contacts coöperating with the switches being such that by varying the position of the switches any pair of polyphase mains may be connected in conducting relation to the single-phase circuit.

The several features of novelty will be more particularly described hereinafter and will be definitely pointed out in the appended claims.

In the drawings, Figure 1 is a diagram of a system embodying my improvements, and Fig. 2 is a side elevation of a switch suitable for carrying them into effect.

1 2 3 represent the mains of a polyphase circuit, shown specifically as a triphase circuit, the energy which it carries being derived from any suitable source of supply—as, for example, a distributing polyphase transformer 4. I lead connections from the several mains to switch-clips, one of the mains having a common connection with two oppositely-disposed clips 5 6 and the others with two oppositely-disposed clips 7 8. The single-phase circuit is connected to an intermediate pair of clips 9 10, in which the switch-levers are journaled. The switches 11 12 may be independently rocked on their pivots, so as to connect any of the four contacts 5 6 7 8 with the mains, to which they are tied or electrically connected.

The mode of effecting the transfer of the circuit from one pair of mains to another is illustrated in the diagram in the several positions of the switches illustrated in the single-phase circuits 13 14 15. As will be evident from an inspection of the diagram, the circuit 13 is connected with the mains 1 and 2 of the alternating-current polyphase circuit. By shifting both switches so as to connect with contacts 7 and 8, respectively, mains 1 and 3 will become the source of current, or by shifting the switch-levers to the position shown at the top of the diagram at circuit 15 the mains 2 and 3 become the source. Thus by a simple manipulation of the single-pole double-throw switches a circuit may be transferred to any pair of mains, so as to adjust the load on the system.

An effective construction for the switch is shown in Fig. 2, in which the contacts are shown as mounted on a suitable insulating base-board of fireproof material—as, for example, slate. The contacts are provided with arcing tips, as indicated at 16 17, which may be of carbon or metal mounted on copper or phosphor-bronze springs secured to the base of the clip. Pivoted to the switch-blade at its sides near the pivot are two elastic strips of phosphor-bronze or other suitable metal connected together by a helical spring 18. Riveted to the free ends of the strips are wiping-contacts 19 20, which in closing the switch pass over the button 16 or 17 and in opening the switch preserve the circuit connections until the blade leaves the clip, thereby bending the elastic strip and permitting it after a sufficient range of movement to snap quickly from the arcing tip, thus opening the circuit with a small arc, a quick movement, and resulting slight damage to the contact-points. In closing the switch rapidly the spring-contacts are apt to move under the force of inertia into sudden contact with the switchboard or support and damage it. In order to prevent this, I provide a buffer 21, which may be a spring-finger, as indicated, and which serves to arrest the movement of the arcing tips.

What I claim as new, and desire to secure by Letters Patent of the United States, is—

1. In a system of distribution for alternating currents, the combination of a polyphase circuit, a single-phase circuit, and two double-throw switches for coupling the single-phase circuit with any pair of polyphase mains according to the position of the switches.

2. The combination with a triphase circuit, of a single-phase circuit, two, independently-movable double-throw switches, one pair of contacts being connected with one of the triphase mains, and the other two contacts with the other two mains respectively.

3. In a system of distribution for alternating currents, a triphase circuit, a single-phase circuit, independently-movable switches connected with the single-phase circuit, and contacts connected with the several triphase mains with which said switches may effect connection.

4. In a system of distribution for alternating currents, the combination of a triphase circuit, a single-phase circuit, two independently-movable double-throw single-pole switches pivoted to the terminals of the single-phase circuit, two switch-contacts in alinement with each switch, one pair of contacts being connected to one of the triphase mains, and the other to the other two mains respectively.

5. A double-throw switch comprising a pivoted switch-blade, contacts at each side of the pivot, arcing strips mounted on the switch-blade and connected together by a spring, arcing tips connected to the contacts adapted to detain the strips after the switch-blade is opened, and a buffer to arrest the movement of the arcing strip when the switch is closed suddenly.

In witness whereof I have set my hand this 26th day of July, 1900.

EDWARD M. HEWLETT.

Witnesses:
BENJAMIN B. HULL,
JAMES J. HIGGINS.